United States Patent [19]

Kawabata

[11] 4,065,711
[45] Dec. 27, 1977

[54] CHOPPER ASSISTED UNINTERRUPTIBLE POWER SUPPLY

[75] Inventor: Takao Kawabata, Amagasaki, Japan

[73] Assignee: Mitsubishi Denki Kabushiki Kaisha, Tokyo, Japan

[21] Appl. No.: 725,052

[22] Filed: Sept. 21, 1976

[30] Foreign Application Priority Data

Sept. 22, 1975 Japan .................................. 50-114589

[51] Int. Cl.² .............................................. H02J 7/04
[52] U.S. Cl. ........................................ 320/14; 320/59; 307/66; 363/27
[58] Field of Search .................. 320/2, 21, 39, 59, 14; 307/64, 66; 363/27, 124, 135

[56] References Cited

U.S. PATENT DOCUMENTS

| 3,801,794 | 4/1974 | Mauch et al. | 307/66 |
| 3,938,020 | 2/1976 | Bourke | 320/21 |
| 3,986,098 | 10/1976 | Tamil et al. | 307/64 X |

Primary Examiner—Robert J. Hickey
Attorney, Agent, or Firm—C. M. Lorin

[57] ABSTRACT

A bilateral chopper is used between an inverter and the standby battery of an uninterruptible power supply, the battery being charged through rectification of the AC power by the feedback diodes of the inverter under controlled voltage by the chopper, the load being supplied with AC power under controlled voltage by the chopper from the standby battery in case of failure of the AC power supply.

8 Claims, 4 Drawing Figures

4,065,711

CHOPPER ASSISTED UNINTERRUPTIBLE POWER SUPPLY

BACKGROUND OF THE INVENTION

The invention relates to an uninterruptible power supply. In such apparatus energy is automatically derived from a standby battery and converted into AC power by an inverter whenever the commercial AC power supply fails.

In the uninterruptible power supply of the prior art many components are required which bear on cost and reliability. The power efficiency of the prior art equipment is less than 85% as a result of the power losses caused by the basic circuits involved, such as a rectifier, a battery charger, etc.

An object of the present invention is to provide an uninterruptible power supply (UPS) apparatus having fewer essential components than heretofore.

Another object of the present invention is to provide UPS apparatus of reduced power losses.

The invention is particularly useful for the supply of power to loads of large size.

SUMMARY OF THE INVENTION

The present invention resides in an uninterruptible AC power supply including a standby battery automatically called upon failure of the AC power supply to provide energy converted from DC to AC. According to the present invention, a bilateral chopper is interposed between the battery and the inverter converting DC from the battery into AC for the load. When AC power is normally supplied to the load, the inverter is controlled so as to operate in reverse from its AC output to rectify AC and generate DC. The chopper transmits DC energy from the inverter in the rectifying mode to the battery which is charged in a floating mode. Upon a failure of the AC power supply, the chopper transmits DC power from the battery into the input of the inverter in its normal mode, and AC power is supplied to the load without interruption. A thyristor switch, preferably force commutated, interrupts instantaneously the AC power system when it fails and the UPS uses the standby mode.

DESCRIPTION OF AN UNINTERRUPTIBLE POWER SUPPLY OF THE PRIOR ART

Figure 1:
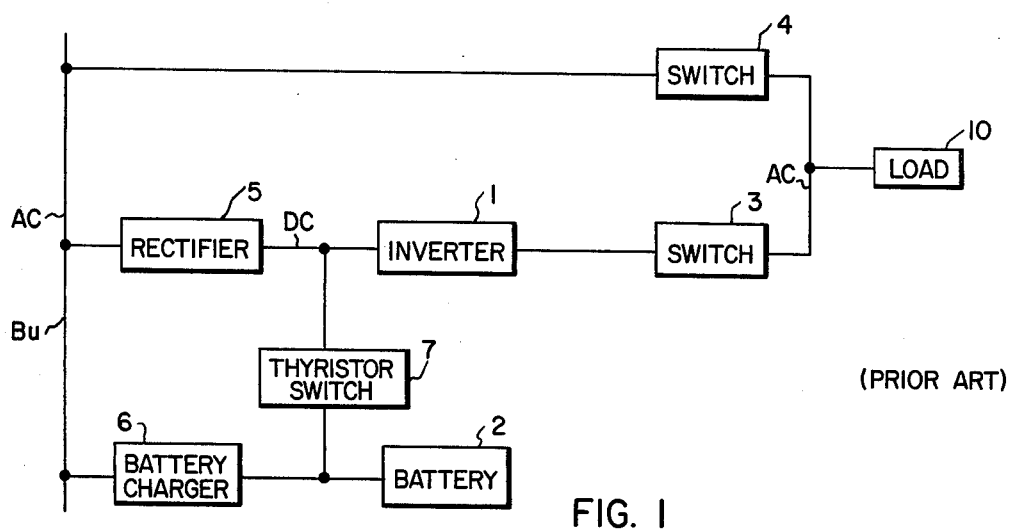
FIG. 1 is a schematic representation of an uninterruptible power supply of the prior art.

Referring to FIG. 1, a UPS of the prior art is shown to include a commercial AC power supply having a bus line $B_u$, a rectifier 5 for converting the AC power of the utility network into DC power on line 70 and an inverter 1 converting the energy from line 70 into AC power at constant voltage and constant frequency. A switch 3 is usually inserted between the output of the inverter, on line 71, and the load 10.

A standby battery 2 is provided constantly charged floatingly by a battery charger 6 from the bus line $B_u$. In case power fails on the bus line $B_u$, a thyristor switch 7 is instantly switched ON and power from the charged battery 2 is supplied from lines 81, 82 onto line 83 to the inverter 1, so that supply of energy by the inverter to load 10 is provided without any interruption.

In case the inverter 1 fails, switch 3 from the inverter to the load is turned OFF while a switch 4 is turned ON, thereby supplying AC directly from bus line $B_u$ on lines 74, 75 to load 10.

DESCRIPTION OF THE INVENTION

Figure 2:
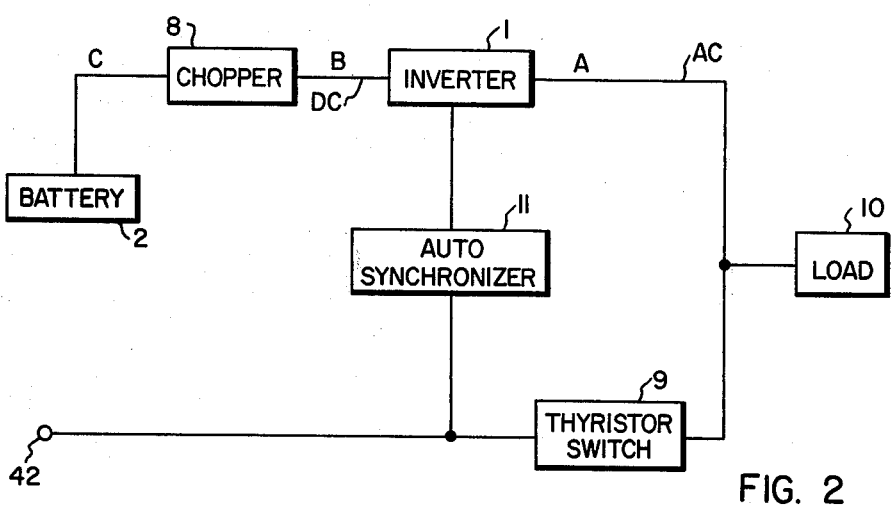
FIG. 2 is a schematic representation of an uninterruptible power supply according to the present invention.

Referring to FIG. 2, the invention takes advantage of the fact that AC power is usually supplied from the AC network $B_u$ on line 90 through a thyristor switch 9 and line 91 to the load, 10 while the AC output on line 91 at point A is being rectified by operation of a feedback diode in inverter 1 so as to generate DC power at point B on the input side of the inverter.

In accordance with the present invention, a direct current chopper 8 is provided having the capability of converting power in both directions. Such bilateral chopper can thus transmit power from the B side thereof to the opposite side at point C which is connected to the standby battery 2. Conversely, chopper 8 can transmit power from the battery to the input of inverter 1. In the first instance the role of chopper 8 is to control the voltage applied to the battery, thereby to charge the battery floatingly. Whenever the commercial network fails to supply power, thyristor switch 9 is cut off and power from C to B is transmitted from the battery through chopper 8 in order to keep the output voltage of the inverter 1 constant.

The invention also provides for an automatic synchronizing circuit 11 to synchronize the inverter 1 with the AC network, so that after the commercial network recovers and thyristor switch 9 is being closed, the output of the inverter 1 on line 92 has the same phase and the same voltage as the AC supply on line 91 to load 10. Thereafter, the phase of inverter 1 is controlled to have a phase somewhat delayed relative to the commercial power on line 90 so that the inverter 1 converts AC power on the A side to DC power on the B side thereof.

Consequently, as AC power is supplied to the load 10 from line 90 on the side of the commercial network, chopper 8 is controlled so as to convert the DC power on the B side thereof to DC power available on the C side of the chopper to charge battery 2, thus preparing it as a standby against power failure. The battery is charged with a constant current when on standby. Then, the chopper 8 transfers to a floating charge condition.

As it appears, the block diagram of FIG. 2 involves fewer components than the block diagram of FIG. 1.

Figure 3:
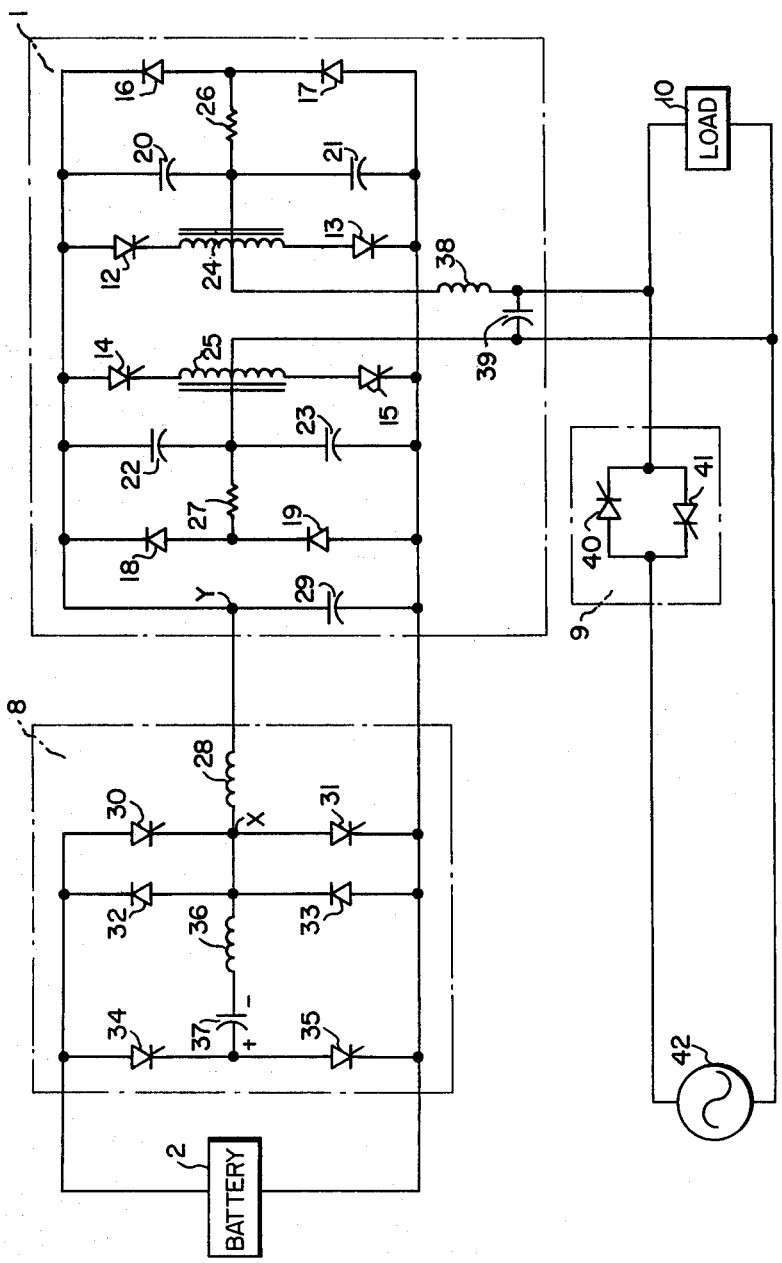
FIG. 3 is a detailed representation of the circuit according to the preferred embodiment of the invention.

Referring to FIG. 3, the preferred embodiment of the invention will now be described with particularity. As generally known, power from the commercial power supply 42 is supplied to the load 10 through a thyristor switch 9 consisting of thyristors 40 and 41.

The inverter 1 effects a rectification of the commercial power available at its output side by operation of feedback diodes 16–19, and charges a smoothing condenser 29. Such rectifying operation can be made when the main thyristors 12–15 of the inverter 1 operate in such a way that the operational phase angle under inverter control is delayed relative to the phase of the commercial power supply due to force commutation.

However, in order to avoid power loss as a result of the inherent converting loss in the inverter, it is possible to discontinue operation of the main thyristors 12-15 at this time.

Referring to FIG. 3, a McMurray type bridge inverter is shown with commutation capacitors 20-23, commutation reactors 24, 25 and feedback resistors 26, 27. 38 is a reactor, 39 a capacitor used as AC filter to generate a sinusoidal voltage waveform at the output of inverter 1. The operation of chopper 8 can be explained as follows:

Chopper 8 includes main thyristors 30, 31, main diodes 32, 33, auxiliary thyristors 34, 35, a commutation capacitor 37 and a commmutation reactor 36. DC reactor 28 reduces the ripple current flowing from the inverter through smoothing capacitor 29.

Main thyristors 30, 31 are alternately switched ON and OFF at a proper rate by operation of the associated auxiliary thyristor, the commutation capacitor and the commutation reactor, and are so controlled in a pulse width fashion that the average voltage value at point X is as desired. By controlling the voltage at point X of the chopper to become higher than at point Y of the inverter, current flows through DC reactor 28 from side X to side Y, and power from battery 2 is being supplied to the inverter side through chopper 8. Conversely, by controlling the voltage at the point X to be lower than at point Y, the charge of capacitor 29 flows from Y to X, and the battery is being charged through chopper 8. Indeed, any type of inverter 1 can be used in order to rectify power from the commercial side and to supply a capacitor such as 29 with DC power.

As earlier explained, whenever there is commercial power from bus line $B_u$ or power source 42, the battery is charged at constant voltage as a result from the boosting operation due to the chopper converting in both directions and to the rectifying action of the inverter operating in the reverse direction. Under such conditions, the battery is prepared for standby in anticipation of a power failure. When the commercial power supply 42 fails, instantaneous detection causes thyristor switch 9 to be switched OFF, and at the same time, the inverter 1 is caused to transfer from the rectifying mode to the inverting mode.

Chopper 8 is controlled so as to keep the voltage of the battery constant during standby. Whenever power fails, chopper 8 controls the voltage at point Y so as to keep it constant, or in case the inverter itself lacks voltage regulation, the control is modified in order to keep the inverter output at the required load terminal voltage. One problem in the above system is that even though the thyristor switch 9 is capable of switching OFF immediately when the commercial power supply fails, it requires a half cycle before the thyristor switch 9 can be switched OFF by natural commutation. During that time, the load on the commercial power supply side becomes a load for the inverter, and the output voltage of the inverter may be reduced sharply during such half cycle.

Figure 4:
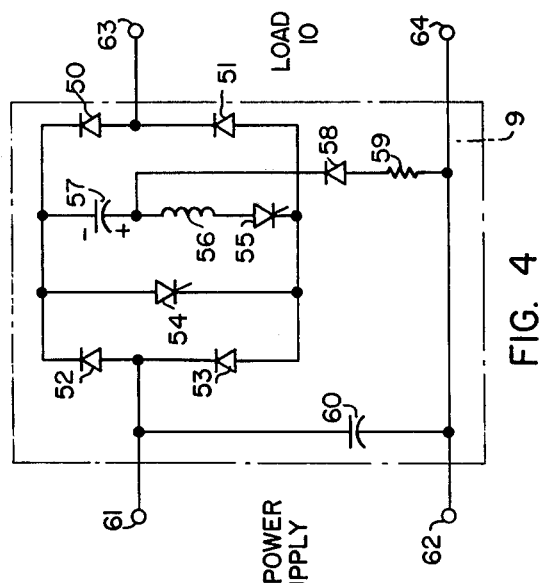
FIG. 4 is descriptive of a thyristor switch of the force commutation type as can be used in the circuit of FIG. 3.

Referring to FIG. 4, a thyristor switch of the forced commutation type is used to prevent such voltage drop during a half cycle. Terminals 61 and 62 are on the commercial power supply side and terminals 63 and 64 are on the load side. Thyristor 54 is usually ON, and the load current flows through thyristor 54 as a direct current due to rectifying action of diodes 50-53. Consequently, when thyristor 54 is ON, terminals 61 and 63 are conductive and when the thyristor is OFF, they become nonconductive.

As the commutation capacitor 57 is being charged with polarities as illustrated, while the thyristor switch needs to be switched OFF, an electric current, having a pulse width depending on capacitor 57 and commutation reactor 56, flows in the reverse direction into thyristor 54. If under such circumstances a gating signal is applied to swithc OFF thyristor 54 and, at the same time, to fire the auxiliary thyristor 55, conduction of thyristor 54 will be terminated.

It is clear from the above description that the thyristor switch of FIG. 4 can be switched OFF in a very short time, say within about 100μs. With the thyristor switch of FIG. 4, a current can be interrupted instantaneously when the commercial power supply fails. Therefore, a voltage drop through a half cycle will not occur and the above-mentioned disadvantage is eliminated.

It is a matter of course that a contactor may be used instead of a thyristor switch whenever interruption is allowed to occur as late as one second after the power supply fails.

The present invention offers an uninterruptible power supply apparatus of simple construction and increased power efficiency which is superior in all respects to prior art UPS systems.

I claim:

1. In an uninterruptible power supply (UPS) for supplying AC power to a load from an AC power supply and for supplying energy to a standby battery with energy converted through an inverter from the AC power supply in anticipation of a failure in the AC power supply, the combination of:

bilateral chopper means connected between said inverter and said battery for providing energy conversion in both directions between said battery and said inverter.

2. The UPS of claim 1 with said bilateral chopper means being controlled to provide regulated DC power voltage for charging said battery and being controlled to supply DC voltage to said inverter when power is derived from said battery.

3. The UPS of claim 2 with said inverter being operative to rectify AC power in a direction to pass DC power through said chopper means to said battery.

4. The UPS of claim 3 in which said inverter includes main thyristor and feedback diodes associated with said main thyristor, said feedback diodes being operative to rectify said AC power toward said chopper means.

5. The UPS of claim 4 in which said inverter is controlled to exhibit a delayed phase angle relative to the phase angle of the AC power from said AC power supply, thereby to cause rectification toward said chopper means.

6. The UPS of claim 5 with said AC power being normally supplied to said load and said inverter having its main thyristors switched OFF while said battery is being charged through the AC power supply.

7. The UPS of claim 1 with switching means being provided for switching OFF said AC power supply in case of failure of the AC power supply.

8. The UPS of claim 7 with said switching means being of the force commutation type.

* * * * *